United States Patent

Date et al.

[11] 4,325,894
[45] Apr. 20, 1982

[54] APPARATUS FOR CONTROL OF LIQUID LEVEL IN CARBURETOR

[75] Inventors: Tasuku Date, Tokyo; Toshio Nomura, Niiza, both of Japan

[73] Assignee: Honda Giken Kogyo Kabushiki Kaisha, Tokyo, Japan

[21] Appl. No.: 56,697

[22] Filed: Jul. 11, 1979

[51] Int. Cl.³ .............................................. F02M 17/02
[52] U.S. Cl. .................................. 261/66; 261/72 R; 261/DIG. 74; 261/DIG. 50; 73/295; 137/386; 137/392
[58] Field of Search ............... 261/DIG. 74, 66, 72 R, 261/DIG. 50; 73/295; 137/428, 386, 392

[56] References Cited

U.S. PATENT DOCUMENTS

| | | | |
|---|---|---|---|
| 1,987,981 | 1/1935 | Tice | 261/DIG. 74 |
| 2,232,035 | 2/1941 | Mennesson | 261/DIG. 50 |
| 3,151,468 | 10/1964 | Martin | 73/295 |
| 3,372,912 | 3/1968 | Benmore | 261/72 R |
| 3,376,026 | 4/1968 | Fisher | 261/70 |
| 3,695,590 | 10/1972 | Nishihara | 261/72 R |
| 4,060,576 | 11/1977 | Grant | 261/70 |
| 4,135,186 | 1/1979 | Minorikawa et al. | 73/295 |

*Primary Examiner*—Tim R. Miles
*Attorney, Agent, or Firm*—Armstrong, Nikaido, Marmelstein & Kubovcik

[57] ABSTRACT

An apparatus to control a liquid level in a carburetor with a fuel chamber formed in a main body of the carburetor. A level detecting element, i.e., thermistor, in the upper portion of the main body produces an electrical signal in response to liquid level, opens and closes an electromagnetic valve. Inflow of the fuel to the chamber is thereby controlled. A small chamber is formed in the fuel chamber by a partition for insertion of the detecting element.

6 Claims, 8 Drawing Figures

APPARATUS FOR CONTROL OF LIQUID LEVEL IN CARBURETOR

BACKGROUND OF INVENTION

This invention relates to an apparatus for control of a liquid level in a fuel chamber of a carburetor used chiefly for a vehicle.

With an apparatus of this kind it has been hitherto usual that the apparatus comprise a float in a fuel chamber and a float needle-valve arranged to move therewith. This conventional type of apparatus, however, is inconvenient, in that, the float is moved in attendance on variation of a liquid level caused by engine vibration, inclination of a vehicle body or the like, and liable to become inaccurate in operation, it also being less reliable, and further it is required that the fuel chamber be comparatively large in size and sufficient to contain the float, so that the apparatus cannot be small in size.

SUMMARY OF INVENTION

The main object of the invention is to provide an apparatus free from the above inconveniences.

According to the present invention, a fuel chamber is formed in a carburetor main body and is provided at an upper portion of the interior thereof with a liquid level detecting element, and an electromagnetic valve controlled to open and close by a signal of the detecting element, so that inflow of fuel into the fuel chamber is controlled.

The invention will be best understood with respect to the accompanying specification, claims and drawings.

IN THE DRAWINGS

DESCRIPTON OF INVENTION

Figure 1:
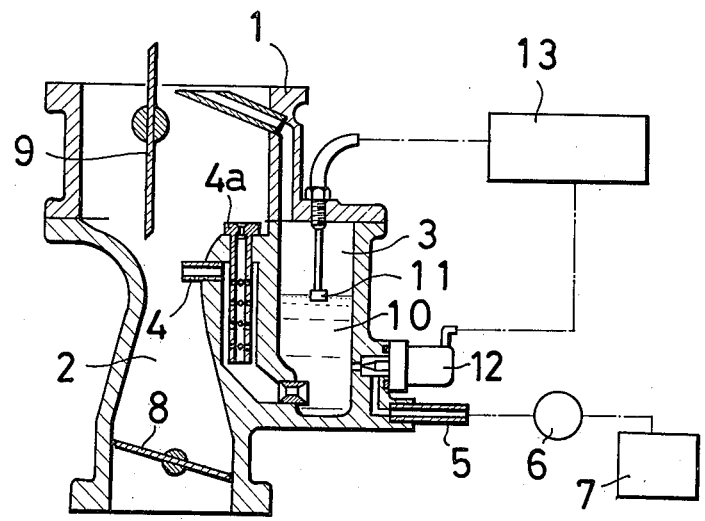
FIG. 1 is a sectional side view of one example of this invention apparatus.

Referring to the drawings, numeral 1 denotes a carburetor main body, a carburetor passage 2 is provided on one side of the interior thereof, and a fuel chamber 3 is provided on the other side thereof, and a nozzle 4 connected to the fuel chamber 3 extends through an air bleed tube 4a into the carburetor passage 2. The fuel chamber 3 is in communication through a sideward extending fuel supply passage 5 with a fuel pump 6 and a fuel tank 7 so that fuel may be charged therethrough in the chamber 3. A throttle 8 is provided in the carburetor passage 2 and numeral 9 denotes a choke valve.

The above construction is not especially different from that in the conventional apparatus. According to the invention, a liquid level detecting element 11 at an upper portion of the interior of the fuel chamber 3 detects a liquid level of the fuel 10 in the fuel chamber 3 by contact with the liquid surface, and additionally the fuel supply passage 5 is provided at its open end with an electromagnetic valve 12 so that the valve 12 may be controlled by a signal operation of the element 11 to open and close, resulting in control of the supply of the fuel into the chamber 3.

Referring to the drawings, control circuit 13 is adapted to be operated on receiving the signal of element 11 for opening and closing of the valve 12. In this case, the element 11 comprises, for instance, a temperature dependent resistance such as a thermistor or the like, is of such a type that the same is changed in its temperature by its contact with the liquid surface and thereby the resistance value thereof is changed.

Figure 2:
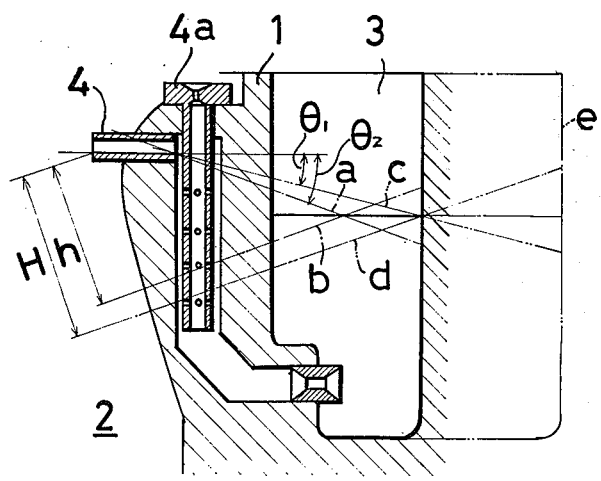
FIG. 2 is a diagram for explaining the operation thereof.

This operation of the apparatus can be understood in the context of the aforementioned structure. When liquid level of the fuel 10 is low, the electromagnetic valve 12 is opened, so that the fuel is supplied through the same into fuel chamber 3. If, thereafter, the liquid level is heightened and the element 11 detects the same, the valve 12 is closed so that the supply of the fuel is stopped. If the liquid level is, then, lowered, the valve 12 is opened again. This is repeated alternately, so that the liquid level of the fuel 10 can always be kept substantially constant. Thus, the inventive apparatus can be improved in reliability as compared with the conventional float type. The same can be made small-sized because it is not required for the fuel chamber 3 to contain a comparatively large float. In this operation, the liquid surface of the fuel 10 in the fuel chamber 3 is inclined to the left side and the right side, as the carburetor main body 1 is inclined to the right and the left, as in the drawings. If the case of a conventional float type as shown, for instance, by double dotted lines e in FIG. 2, is now taken into consideration, the liquid surface at the time of the left inclination is shown by a line c and that at the time of the right inclination is shown by a line d. By these inclinations, the liquid level in the bleed tube 4a is moved upward and downward, and consequently, not only the density of the mixture produced in the carburetor passage 2 is varied but also especially on the occasion of the left inclination, there is a fear that the fuel 10 overflows continuously from the nozzle 4 through the bleed tube 4a into the carburetor passage 2. However, according to the foregoing construction of the invention, on the occasion of the right inclination thereof, the liquid level is such as the one shown by a line b. Accordingly, the height h between the nozzle 4 and the liquid surface is smaller than H, where H is that in the conventional construction. Additionally, on the occasion of the left inclination, the liquid level is such as the one shown by a line a, and accordingly, as overflow limit angle $\theta_2$ is larger than $\theta_1$, where $\theta_1$ is that in the conventional one. Thus, the present invention is advantageous in that a turning performance of a vehicle can be improved.

Figure 3:
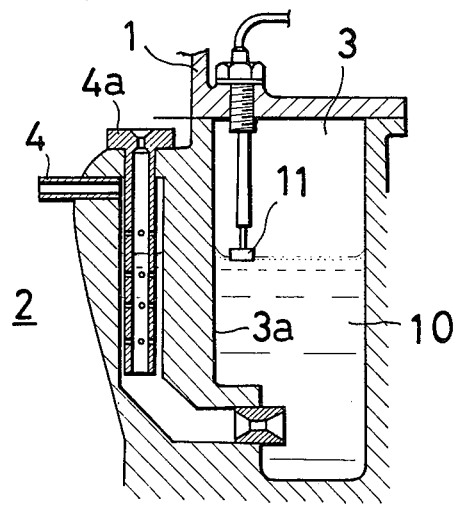
FIG. 3 is a sectional side view of part of another example of this inventive apparatus.

As will be clear from the above, in its operation, the liquid level height on the nozzle 4 side is especially important, and it is therefore preferable that the detecting of the liquid level be affected at a position near the nozzle 4 side, and for this purpose the apparatus is so constructed, for instance, as shown in FIG. 3. Namely, the element 11 is so provided in the fuel chamber 3 as to be positioned near the carburetor passage 2. In this case, the element 11 is closest as possible toward a side wall 3a of the chamber 3, but the same is required to be somewhat apart therefrom in order to avoid the influence of a meniscus caused by surface tension produced near the side wall 3a.

Figure 4:
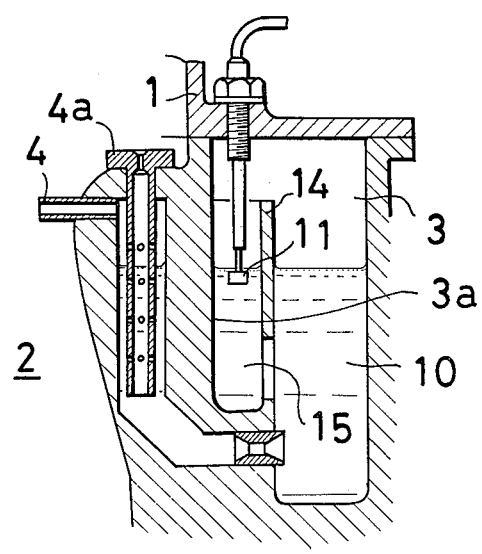

It is usual that the liquid surface is moved to be inclined to right and left as mentioned before. For protecting the element 11 as much as possible from having the influence thereof, the apparatus is constructed, for instance, as shown in FIG. 4. A partition wall 14 is provided in the chamber 3 with a small chamber 15 so as to form on one side of the chamber and the element 11 is provided in the small chamber 15.

Figure 5:
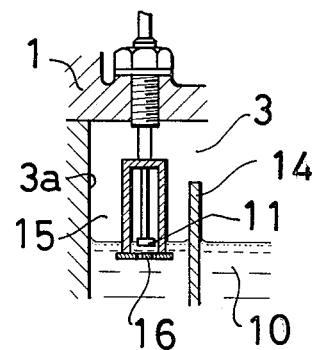
FIGS. 4 to 6 are sectional side views of parts of respective modified examples thereof.
Figure 6:
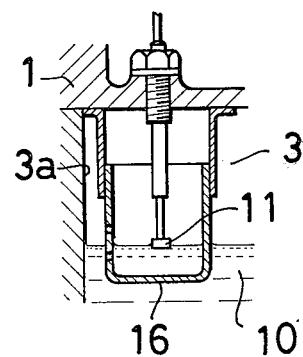

Furthermore, there is such a tendency that if the liquid surface is ruffled by engine vibration or the like, it affects on the element 11. For protecting the element 11 from the ruffling, such a countermeasure can be considered that, as shown in FIGS. 5 and 6, for instance, a ruffling preventing plate 16 such as a lattice form, a net form or the like, is provided so as to surround the element 11.

Figure 7:
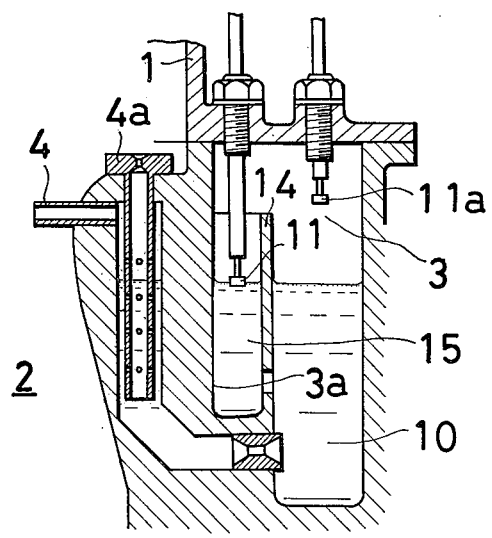
FIG. 7 is a sectional side view of part of another modified example thereof and FIG. 8 is a circuit diagram thereof.
Figure 8:
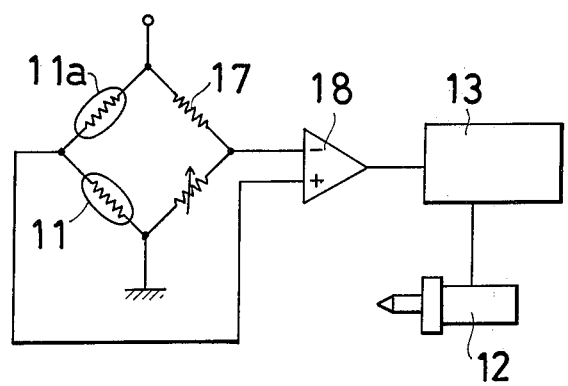

The element 11 is a temperature dependent resistance such as a thermistor or the like, as mentioned before. In this case, the same is influenced not only by a temperature change caused by its contact with the liquid surface but also by a change in an external temperature, and therefore it is necessary to compensate the influence caused by the external temperature. As one countermeasure, for example, it is preferable that, as shown, for instance, in FIG. 7, a second element 11a is provided at an upper portion of the interior of the chamber 3 and at such a position that the same cannot contact the liquid surface, and a bridge 17 including these two elements 11, 11a is so constructed as shown, for instance, in FIG. 8 for effecting a temperature compensation. Numeral 18 denotes a comparator provided on its output side.

Thus, according to the invention, the liquid level detecting element is provided at an upper portion of the interior of the fuel chamber and the electromagnetic valve is controlled to open and close by a signal thereof, so that the supply of the fuel into the chamber is controlled, and thus the foregoing disadvantages in the conventional type of apparatus can be removed, and an excellent apparatus can be obtained simply and economically.

Many modifications and variations of the present invention are possible in light of the above teachings. It is, therefore, to be understood that within the scope of the appended claims, the invention may be practiced otherwise than as particularly described.

What is claimed:

1. An apparatus for control of a liquid level in a carburetor, including: a fuel chamber; said fuel chamber being formed in a carburetor main body; a liquid level detecting element, said liquid level detecting element being disposed at an upper portion of the interior of said fuel chaber; and an electromagnetic valve, said valve being controlled to open and close by a signal of the detecting element, so that inflow of fuel into the fuel chamber is controlled; said liquid level detecting element comprising a temperature dependent resistance for detecting by contact with the liquid surface; a small chamber being formed in said fuel chamber by means of a partition wall, and said element being provided in said fuel chamber for insertion in said small chamber.

2. An apparatus as claimed in claim 1, wherein: said resistance is a thermistor.

3. An apparatus as claimed in claim 1, wherein: the fuel chamber is provided on one side and adjacent to a carburetor passage in said carburetor main body, and said detecting element is provided in the fuel chamber proximate to said carburetor passage.

4. An apparatus as claimed in claim 1, wherein: a ruffling preventing plate in the form of a lattice is provided in the fuel chamber so as to surround the element.

5. An apparatus as claimed in claim 1, wherein: said ruffling preventing plate is in the form of a net.

6. An apparatus as claimed in claim 1 wherein said resistance is a thermistor; said fuel chamber being located on one side and adjacent to a carburetor passage in said carburetor main body, and said detecting element being located in the fuel chamber proximate to said carburetor passage; a ruffling preventing plate in form of a lattice being in the fuel chamber so as to surround the element, said ruffling preventing plate being in form of a net.

* * * * *